March 21, 1950 — N. C. PRICE — 2,501,633
GAS TURBINE AIRCRAFT POWERPLANT HAVING
DUCTED PROPULSIVE COMPRESSOR MEANS
Filed June 28, 1943 — 4 Sheets-Sheet 3
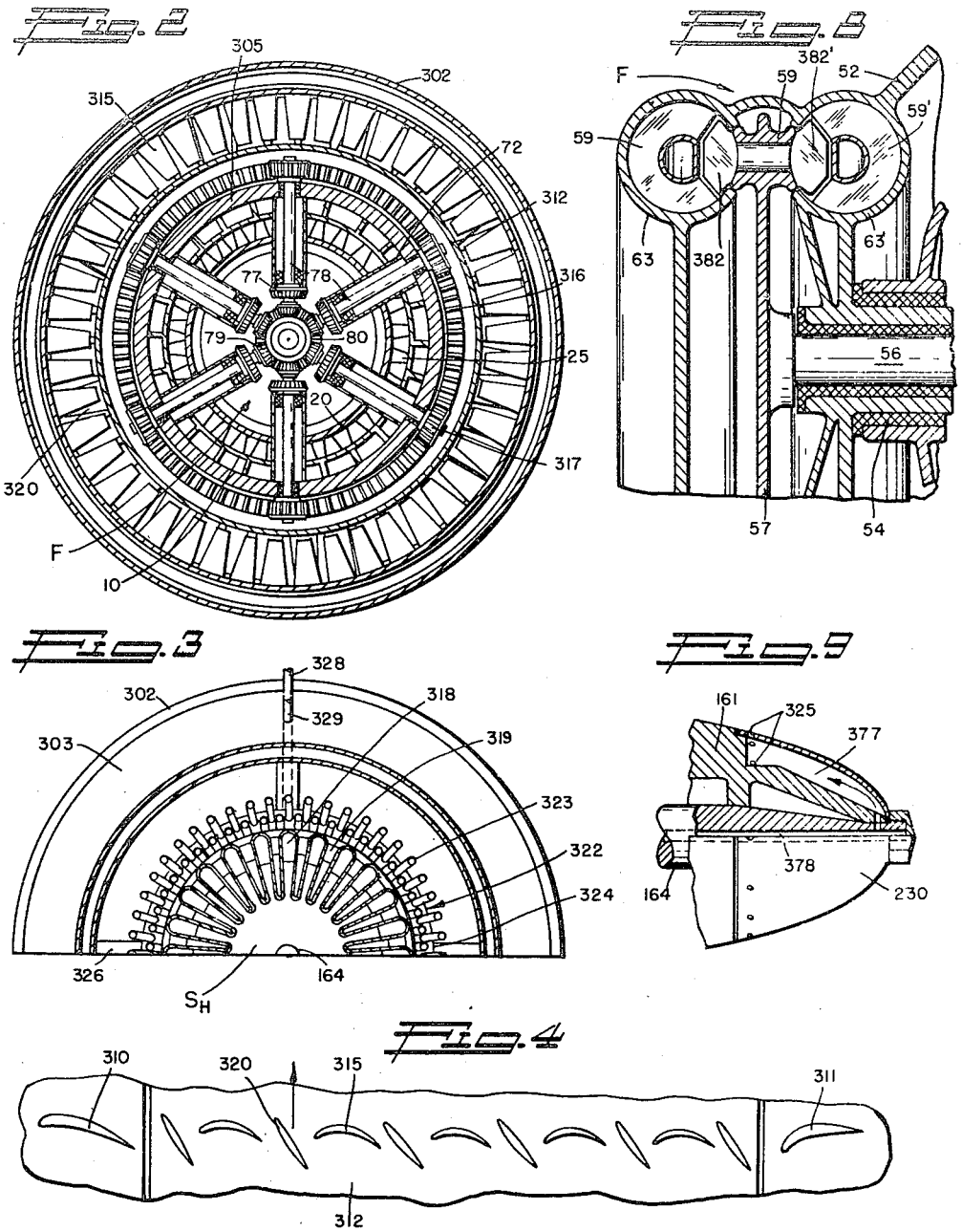
Inventor
Nathan C. Price
By George C. Sullivan
Agent

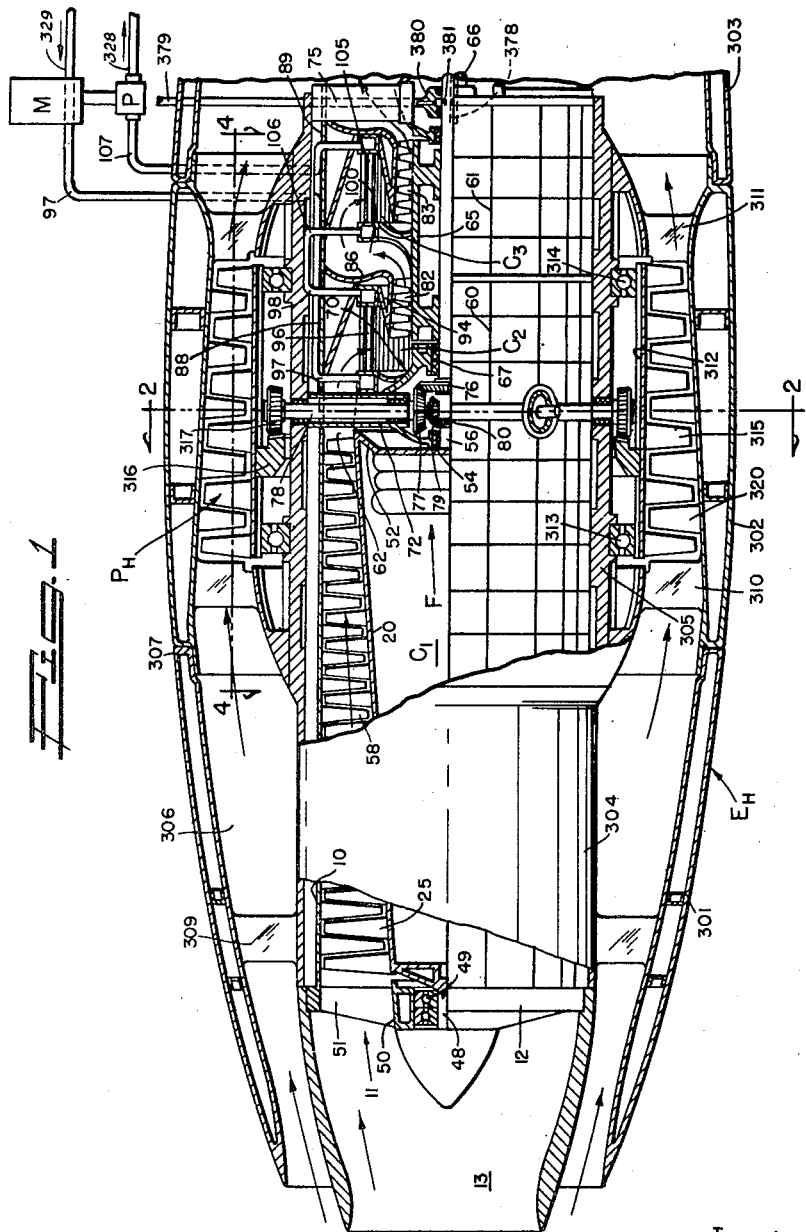

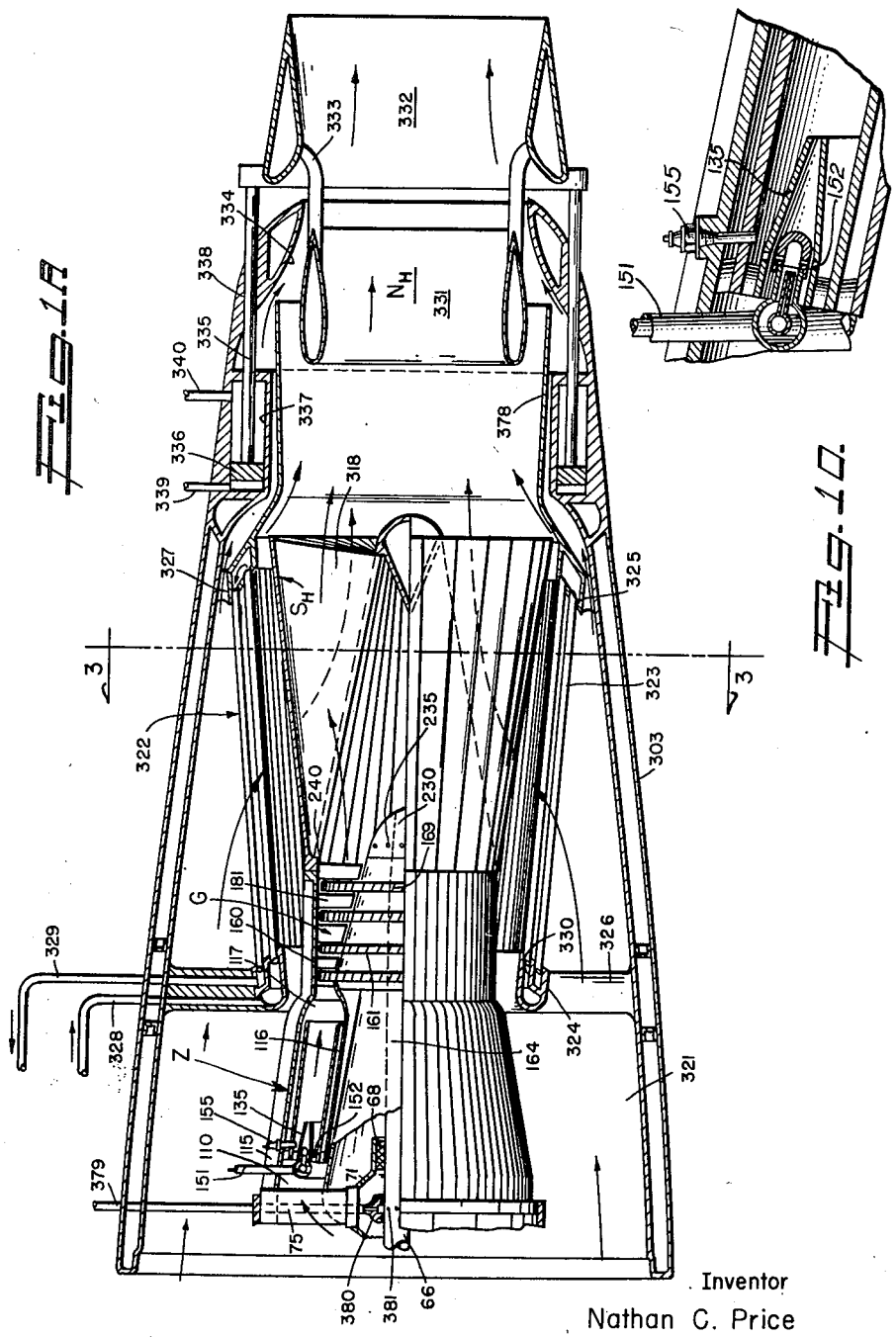

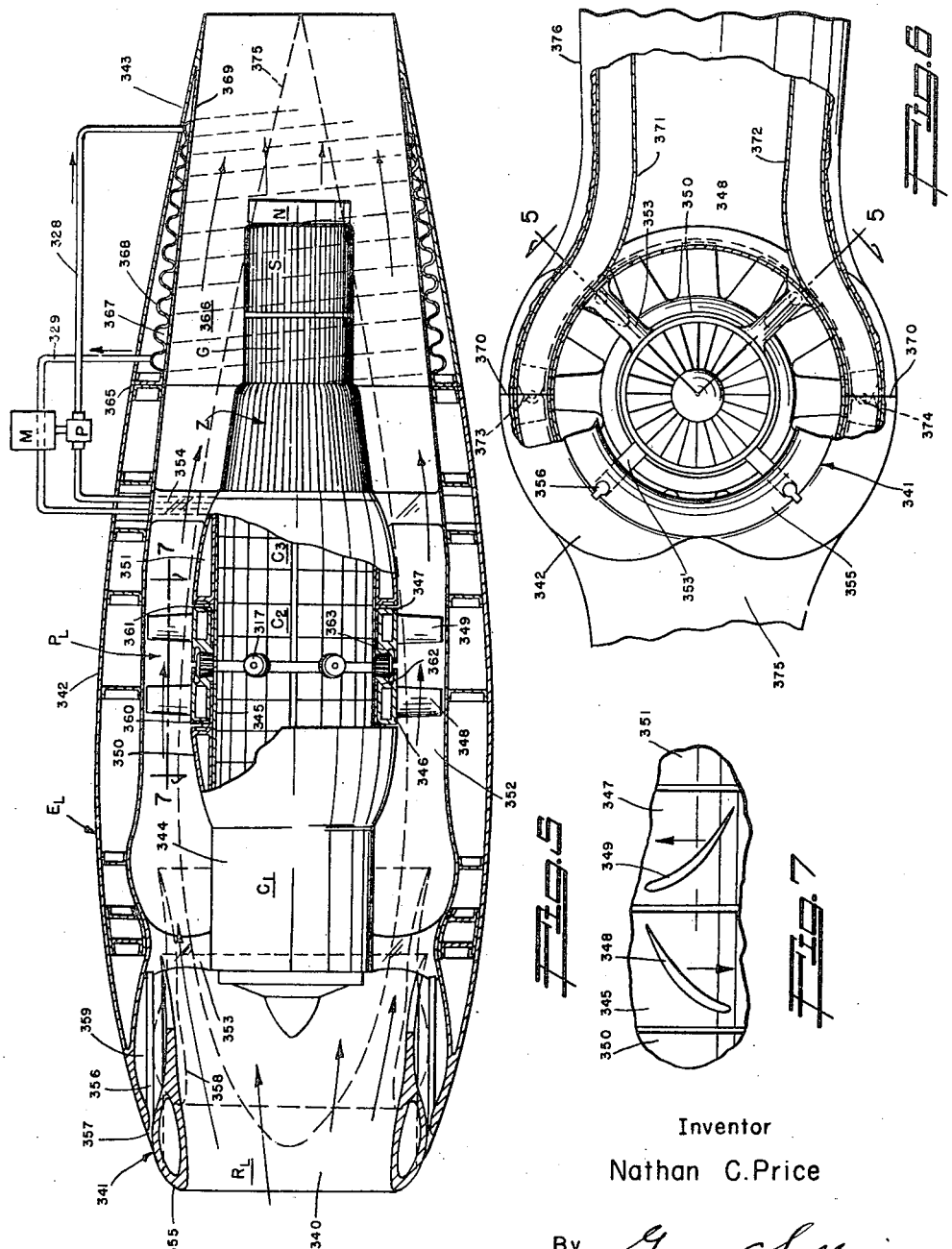

Patented Mar. 21, 1950

2,501,633

UNITED STATES PATENT OFFICE 2,501,633

GAS TURBINE AIRCRAFT POWER PLANT HAVING DUCTED PROPULSIVE COMPRESSOR MEANS

Nathan C. Price, Hollywood, Calif., assignor to Lockheed Aircraft Corporation, Burbank, Calif.

Application June 28, 1943, Serial No. 492,647

28 Claims. (Cl. 60—35.6)

This invention relates to prime movers of the gas reaction type in general and more particularly to the internal combustion, reaction types of engines which function in the manner commonly known as "jet propulsion," and this application is a continuation-in-part of copending application, Serial Number 433,599, filled March 6, 1942, and of Serial Number 488,029, filed May 22, 1943, which has eventuated in Patent Number 2,468,461, dated April 26, 1949. This invention finds its principal application as a power plant or prime mover for aircraft and the like high velocity vehicles and particularly high altitude airplanes designed for substratosphere or stratosphere flight, and also for airplanes which must be operated over very long ranges with high propulsive efficiency.

Present trends in development indicate that in aircraft employing conventional propellers for propulsion, the practical limit of speeds attainable lie in the region of five hundred miles per hour. This limitation exists by reason of the inherent abrupt falling-off of propeller efficiencies to low values which become prohibitive in power requirements at velocities where local air speeds relative to the propeller blade airfoils approach that of the velocity of sound. The efficiencies of propellers of conventional design or of practical size when operated under rarified atmospheric conditions are such as also substantially to preclude their use in high speed stratosphere flight. Furthermore, the frontal area of airplanes for extremely high speed operation must necessarily be reduced below that now possible with the conventional types of power plants. This may be more conveniently accomplished by the novel features incorporated in the design of the power plant of this invention as will be described hereinafter.

It is accordingly an object of this invention to provide a propulsive unit and associated apparatus which will be capable of imparting increased economy and flight range to the aircraft with which it is associated.

It is a further object of this invention to provide an improved aircraft propulsive unit which shall be economical in fuel consumption, light in weight, and have a reduced frontal area in proportion to power developed.

It is a further object of this invention to provide a propelling apparatus adapted to be employed in connection with an aircraft power plant and having an improved structure and superior operating efficiency, particularly under conditions where compressibility effects ordinarily render the conventional propeller inoperative.

The objects of this invention are attained in general by providing a power plant which produces propulsive work and force wholly or in part by means of the reaction of a high velocity expansible fluid jet.

When a propulsive jet type of power plant is used to achieve these objects, it is desirable for such a power plant to be capable of inducting and subsequently expelling a very large weight flow of air to maintain high propulsive efficiency during periods of comparatively low speed operation, if maximum efficiency and range of operation is to be attained and maintained under such conditions.

It is therefore a still further object of this invention to provide a propulsive unit operating on the jet reaction principle, which is adapted to induct and impart a relatively high reactive velocity to a very large mass flow of air in order to provide a greater thrust at all of the operating speeds, particularly the lower range of speeds of the aircraft in which it is installed.

Other objects and features of novelty will be evident hereinafter.

In the drawings which illustrate preferred embodiments of the invention:

Figures 1 and 1A are longitudinal sectional elevations of the general assembly of the power plant of this invention showing a high pressure type of housed propeller unit.

Figure 2 is a cross-section of the power plant taken on line 2—2 of Figure 1.

Figure 3 is a semi-cross-section of the power plant taken on line 3—3 of Figure 1A.

Figure 4 is a fragmentary cross-sectional view taken on line 4—4 of Figure 1 showing the axial blower blade arrangement.

Figure 5 is a longitudinal sectional elevation of an alternative modification of the power plant of this invention showing a low pressure type of housed propeller unit, the section being taken on line 5—5 of Figure 6.

Figure 6 is a fragmentary frontal view of the power plant unit of Figure 5 shown in partial cross-section as installed in an airplane wing.

Figure 7 is a fragmentary cross-sectional view taken on line 7—7 of Figure 5 showing the counter-rotating impeller blade arrangement.

Figure 8 is an enlarged fragmentary cross sectional view of the fluid drive unit of Figure 1.

Figure 9 is an enlarged fragmental sectional view of a portion of the gas turbine rotor.

Figure 10 is an enlarged fragmentary sectional view of combustion chamber means of the unit shown in Figures 1 and 1A.

Referring to the drawings in which like reference numerals refer to corresponding parts throughout the several views, the apparatus of the invention is as follows:

The power plant apparatus of Figures 1 to 4 comprises nine main components, namely the first stage axial blower $C_1$, the intermediate and final stage axial compressors $C_2$ and $C_3$, the combustion chamber Z, gas turbine G, discharge spud and secondary combustion zone within the spud $S_H$, propulsive compressor $P_H$, streamline diffuser envelope $E_H$, and variable area propulsive discharge nozzle $N_H$, which are hereinafter more fully described in the order named.

The alternative form of power plant apparatus of Figures 5 to 7 comprises ten main components, namely the first stage axial blower $C_1$, the intermediate and final stage axial compressors $C_2$ and $C_3$, the combustion chamber Z, gas turbine G, secondary combustion zone S, nozzle N, propulsive compressor $P_L$, the streamline diffuser envelope $E_L$, and variable area forward inlet $R_L$, which are also hereinafter more fully described in the order named.

That portion of the power plant unit which may be considered as the prime mover in the present case and comprising components $C_1$, $C_2$, $C_3$, Z and G, together with their component structural and mechanical details, shown in the drawings as concentrically positioned within the streamline envelopes $E_H$ and $E_L$ of Figures 1 and 5 are identical in construction to one another and to the corresponding power plant components of copending application Serial No. 488,029, filed May 22, 1943, now Patent Number 2,468,461. The secondary combustion zone S and variable area nozzle N of Figure 5 are also identical to those disclosed in detail in the beforementioned copending patent application. The secondary combustion zone within the spud $S_H$ and the variable area nozzle $N_H$ associated with the apparatus of Figure 1 differ from those hereinbefore shown as hereinafter described.

At the forward end of the first mentioned embodiment of the power plant as shown in Figures 1 to 4, a cylindrical housing 10 is provided for the multi-stage axial blower $C_1$ which constitutes the first stage air compressor. The housing 10 is provided at the forward intake end with an annular air intake opening 11 defined by a spigot 12, both of which are substantially full axial blower diameter and to which a coaxially positioned forwardly directed divergent ram member 13 is attached. The shell 20 of the rotor of the axial blower $C_1$ has the form of a truncated cone of increasing diameter in the direction of flow and is preferably fabricated from a relatively thin metal tube spun or otherwise suitably formed to the desired shape. The forward end of the axial blower rotor 20, contained within the housing 10, carries a coaxially positioned hollow spindle 48 upon which it is rotatably supported in suitable bearings 49 contained within the streamlined forward bearing housing 50. The said forward rotor bearing housing 50 is supported and centrally positioned within the axial blower housing inlet spigot 12 by means of a plurality of radially disposed, stationary vanes 51.

The rear end of the rotor shell 20 is closed by the housing of a double fluid coupling unit F which is centered in the rotor shell by an annular diaphragm 52 and carries a coaxially positioned rearwardly extending tubular hub 56 upon which the rear end of the rotor shell and the fluid coupling housing F are rotatably supported in bearing 54.

The axial blower housing 10 carries on its inside surface a plurality of rows of inwardly extending radially disposed, stationary diffuser or counter-vanes 58 arranged to stand, with small clearance, intermediate the impeller blades 25 of the blower rotor 20. The axial blower housing 10 and also the intermediate and final stage compressor housings 88 and 89 which may be fabricated or cast of a light weight metal such as a suitable magnesium alloy, are preferably provided on the outside surface with a plurality of relatively deep intersecting, laterally, and longitudinally disposed ribs as shown at 60 and 61 for the purpose of imparting sufficient stiffness thereto to maintain impeller-blade-counter-vane clearances to close tolerances.

The discharge end of the first stage axial blower $C_1$ terminates in an annular passage 62 which leads to the inlet passage of the intermediate stage axial compressor $C_2$ and thence to the final stage axial compressor $C_3$.

The intermediate and final stage axial blowers $C_2$ and $C_3$ comprise a common rotor shell 65 carried on a shaft 66 which is rotatably journaled adjacent its forward end in bearings 67 and at its rearward end in bearing 68. Bearings 67 and 68 are supported coaxially within the body of the intermediate and final blower stages and the power plant housing as a whole by suitable, centrally disposed bell shaped housings 70 and 71 respectively, which are in turn each supported from the power plant housing by means of six radially positioned tubular columns as shown at 72 in Figures 1 and 2 at the forward bearing and one of which is shown at 75 in Figure 1A at the rearward bearing. The forward end of the shaft 66 carries a bevel gear 76 which meshes with a cluster of six bevel gears shown at 77 in Figures 1 and 2 and which are fixed to radial shafts as shown at 78 which extend through and are rotatably mounted upon suitable bearings within the before-mentioned radial columns 72. The outer extensions of the shafts 78 are geared to the rotor of the propulsive compressor $P_H$ through a plurality of pinions as hereinafter more fully described. Also fixed to the inner ends of the radial shafts 78 is a cluster of pinions 79 which mesh with bevel gear 80 carried on the rear end of the fluid coupling impeller spindle 56. The fluid coupling spindle 56 is thus adapted to be driven from shaft 66 in a direction opposite to and at a lower speed than that of the intermediate and final stage compressor rotors as hereinafter more fully described.

The fluid coupling impeller spindle 56 carries on its forward end a disc 57 which in turn carries a circumferential impeller ring 59 and a plurality of longitudinally extending impeller blades 382 and 382' attached thereto. The impeller blades 382 and 382' extend longitudinally into the toroidal shaped fluid chambers 63 and 63' which carry the impeller vanes 59 and 59'.

The rotor 65 carries a plurality of rows of impeller blades as shown at 82 and at 83 in the intermediate and final stages respectively. The rows of stationary counter-vanes shown intermediate the impeller blades 82 and 83 are carried on the cylindrical sub-housings 86 and 87 which are centrally supported within the main housings 88 and 89.

The air flow channel leads from the first stage axial blower discharge 62 to the inlet of the intermediate axial compressor stage through an annular shaped intercooler 96 positioned in the said flow channel. The intercooler 96 may be of any suitable construction such as for example one employing a plurality of parallel, longitudinally positioned metal tubes arranged in the form of an annulus, through which a suitable cooling liquid such as water or ethylene glycol may be circulated by way of pipes 97 and 98 from the heat exchanger as hereinafter more fully described. The airflow channel from the annular discharge passage 100 of the intermediate axial compressor stage leads to the inlet of the final axial compressor stage through a second annular shaped intercooler 105 positioned in the said flow channel, and this intercooler, as in the case of the first intercooler, may be of any suitable construction such as one employing a plurality of parallel metal tubes arranged in the form of an annulus and through which a cooling liquid such as water or ethylene glycol may be circulated from the heat exchanger through pipes 106 and 107. The discharge of the final stage axial compressor leads through an annular passage to the entrance 110 of the combustion chamber Z.

The combustion chamber Z into which the final stage compressor $C_3$ discharges, is an approximately annular space of slightly diminishing average diameter towards its outlet, defined on the outside by the ribbed housing 115 and on the inside by a concentric partition 116, both preferably fabricated from a heat resistant material such as a nickel-chromium-iron alloy. The combustion chamber Z converges at the rear portion to an annular nozzle 117 having an outlet passage of reduced area. Liquid fuel is introduced through fuel pipe 151 into the forward end of the combustion zone through suitable jets located within an annular burner 135 which is provided with apertures 152 through which the atomized fuel-air mixture is sprayed.

The gas turbine G of the power plant which is contained within the ribbed cylindrical housing 160 comprises a hollow rotor 161 having the general shape of a truncated cone which is coaxially positioned within the said power plant with the end of minimum diameter facing rearwardly in the direction of flow of the propellant gases to form an expansion zone of increasing cross-sectional area between said rotor and the inside surface of said housing. The turbine rotor 161 is fixed to the rear end of a hollow shaft 164 which is in turn rotatably supported concentrically within the power unit upon suitable bearings, one of which is shown at 68. Compressor shaft 66 forms a forward extension of the turbine shaft 164. The gas turbine rotor 161 is provided with a plurality of rows of impeller blades or buckets as illustrated at 169. A plurality of rows of stationary turbine intermediates or stator blades as illustrated at 181 are fixed intermediate the beforementioned rows of impeller blades and are supported from the inner surface or lining of the turbine housing.

At the apex of the turbine rotor, a conical cap member 230 encloses a space 377 into which liquid fuel may be injected under pressure through the central bore 378 of the hollow turbine shaft 164. The conical cap 230 is provided with a plurality of divergingly directed orifices 235 equi-spaced in its periphery and adjacent its end of greatest diameter where it meets and makes fluid tight connection with the rotor body 161. Provision is thus made for injection of supplementary fuel into the gases leaving the turbine at this point to consume the excess air whereby the thrust of the power plant may be augmented. The liquid fuel may be introduced into the said shaft bore 378 under suitable pressure from a lateral feed pipe 379 which makes fluid tight connection with the turbine shaft through a double packing gland 380. A series of radial ducts 381 interconnect the cavity of the double gland 380 and the shaft bore 378.

Located immediately at the rear of the gas turbine and attached at 240 to the gas turbine housing is the spud $S_H$ which encloses the secondary combustion zone. The discharge spud is shaped and otherwise adapted to efficiently utilize the heat and kinetic energy of the gas issuing from the turbine expansion zone such that it will be additive to the kinetic energy of the propulsive air stream supplied by the propulsive compressor $P_H$. The spud $S_H$ may be constructed of a relatively thin refractory sheet metal such as Inconel, a nickel-chromium-iron alloy, formed into an annularly arranged series of radially extending folds of increasing radial depth from front to rear. Parallel inner and outer longitudinal passages 318 and 319 of increasing depth from front to rear are thus formed separated by the sheet metal folds, the inner passages 318 being adapted to carry the combustion gases discharged from the gas turbine and to form a secondary combustion zone for fuel injected through the orifices 235, and the outer parallel passages being adapted to carry the air discharged from the propulsive compressor $P_H$. Air and combustion gases are thus adapted to be uniformly and efficiently commingled at the discharge ends of the passages of said spud whereby the kinetic energy and heat of the gases and air may be efficiently interchanged in a large total mass flow, whereby high Froude's propulsive efficiency may be attained.

Concentrically surrounding the length of the power unit portion of the apparatus hereinbefore described, is a streamline shaped enclosure or envelope structure $E_H$ having a forward divergent section, an intermediate section, and a rearward convergent section 301, 302 and 303 respectively. Intermediately surrounding and making a close fit over the ribbed outer surfaces of the first, intermediate and final stage compressor housings is a cylindrical shroud member 304 and a cylindrical bearing support 305 for the propulsive compressor rotor 312 which form, in conjunction with the outer envelope member 301 and 302 a smooth, annular air passageway 306 of varying cross-sectional area from end to end of the power unit. The forward and intermediate sections of the envelope 301 and 302 which are joined at 307 are rigidly supported in concentric alignment with respect to the shroud member 304 and the cylindrical bearing supporting member 305 by means of a plurality of interconnecting, radially positioned streamlined struts as shown at 309, 310 and 311. The struts 310 and 311 may be curved airfoil sections shaped as shown in Figure 4 to assist in the efficient entrance and discharge of air from the propulsive compressor $P_H$.

The propulsive compressor $P_H$ comprising an inner rotor shell 312 carrying a plurality of rows of impeller blades 315 is rotatably mounted on ball bearings 313 and 314 encircling the beforementioned cylindrical bearing support 305. The rotor is adapted to be driven by the ring gear 316 with which the six pinions 317 carried on the outer ends of the radial drive shafts 70, mesh. The plurality of rows of intermediate stationary vanes 320 which extend inwardly intermediate the said rows of impeller blades 315 are carried on the inner surface of the intermediate envelope member 302 which thus constitutes the propulsive compressor housing. The compression zone of the propulsive compressor is formed with a decreasing cross-sectional area from inlet to discharge as shown.

The propulsive compressor discharge leads into the annular space 321 formed between the rear envelope section 303 and the combustion chamber and turbine housing 115 and 160.

A heat exchanger 322 comprising a plurality of tubes 323 arranged in the form of a truncated cone surrounding the folds of the spud $S_H$ and extending between forward and rearward headers 324 and 325 is suspended in the said annular space 321 by means of a plurality of radially positioned streamline struts as shown at 326 and 327. Fluid connection is made to the forward header 324 of the heat exchanger 323 through pipes 328 and 329 which enter through one or more of the struts 326. The forward header is divided by a partition 330 at a point between the inner and outer conically arranged rows of tubes whereby fluid entering through pipe 328 flows rearwardly through the inside row of heat exchanger tubes to the rear header 325 and return through the outside row of tubes to the outlet pipe 329. Circulation of cooling fluid from the intermediate and final stage compressor intercoolers to and through the heat exchanger 323 is effected by means of a pump P driven by any suitable means such as a motor M, the flow being from intercooler to exchanger by way of pipe 187, pump P and pipe 328 and return through pipes 329 and 97.

At the outlet end of the rearward section 303 of the envelope $E_H$ is a variable area propulsive nozzle $N_H$. The said nozzle $N_H$ is provided with an inner longitudinally movable airfoil sectioned annular throat member 331 and an outer longitudinally movable airfoil sectioned annular throat member 332 which are interconnected by a plurality of parallel, axially disposed tie rods as best shown at 333 which extend longitudinally through the nozzle throat contraction 334 at the end of the envelope $E_H$. The outer and inner throat members 331 and 332 are also slidably supported upon a plurality of piston rods 335 which are fixed at their rearward ends to the outer throat member 332 and are attached at their forward ends to an annular piston 336 which is adapted to longitudinal reciprocation within the annular shaped cylinder 337 contained within the hollow rear end portion of the said envelope $E_H$.

The piston rods 335 are slidably supported and guided in suitable bearing channels 338 extending longitudinally through the contracted portion 334 of the envelope outlet. The annular piston 336 is actuated to move the throat members by fluid under pressure introduced through pipes 339 and 340. My copending application Serial Number 581,994, filed March 10, 1945, now Patent No. 2,487,583, and which is a division of application Serial Number 488,029, now Patent No. 2,468,461, describes and claims a similar form of nozzle and nozzle operating means.

A tubular shroud member 378 extends from the rear header 325 of the heat exchanger 322 into the rear end of the envelope to a point adjacent the outlet contraction 334 to form a smooth guiding shield for the air and combustion gas mixture discharged through the spud $S_H$. The shroud member 378 is spaced from the envelope walls sufficiently to allow flow of a small quantity of relatively cool air therebetween to cool and protect the envelope structure and the nozzle actuating cylinder 337 from the heated gases.

Referring now primarily to the alternative apparatus of Figures 5 to 7, the prime mover or power units components $C_1$, $C_2$, $C_3$, Z and G as hereinbefore stated, are identical to those corresponding components of the same reference character of Figures 1 and 2. The discharge nozzle N however may be preferably provided with a pair of movable throat members for varying its cross-sectional area as shown and described in the before-mentioned copending parent application.

Concentrically surrounding the length of the power unit portion of the apparatus hereinbefore described, is a streamline shaped enclosure or envelope structure $E_L$ having a divergent variable area inlet opening 341, an intermediate housing section 342 and a rearwardly convergent discharge section 343. Immediately surrounding and making a close encircling fit over the ribbed outer surfaces of the first, intermediate, and final stage compressor housings $C_1$, $C_2$, and $C_3$, are a cylindrical shroud member 344 and a cylindrical bearing support member 345 and also rotor fairings 350 and 351 for a pair of rotors 346 and 347 upon which the counter-rotating rows of impeller blades 348 and 349 are carried. The two rows of counter-rotating impeller blades 348 and 349 constitute the propulsive blower hereinafter referred to. The shroud member 344 and fairings 350 and 351 in conjunction with the outer concentric envelope form a smooth annular air passageway 352 of varying cross-sectional area extending through the propulsive impellers 348 and 349 from end to end of the unit. The forward and intermediate envelope sections 341 and 342 are supported in concentric alignment with respect to the shroud and bearing support members 344 and 345 by means of a plurality of interconnecting radially positioned streamline struts as shown at 353 and 354.

The forward inlet 340 of the envelope $E_L$ is provided with a longitudinally movable annular vane member 355 approximately airfoil shaped in cross-section. The annulus is slidably supported for longitudinal motion on a plurality of axially positioned bulb sectioned rod guides 356 which are fixed at their rearward ends in the struts 353 and at their forward ends in the leading edge portion 357 of the envelope $E_L$. With the movable annulus 355 in the forward position as shown, the inlet area is at a minimum while when the annulus is in its extreme rearward position as shown in dotted lines at 358 the channel 359 formed between the annulus and envelope is open to the leading edge resulting in a substantial increase in the overall effective cross-sectional area of the inlet opening. My copending application Serial Number 693,471, filed August 28, 1946, is directed to a variable area inlet of the kind just described.

The propulsive blower comprises a pair of rotors 346 and 347 as beforementioned, rotatably mounted on bearings 360 and 361 which encircle the bearing supporting member 345, the rotor shells carrying rows of airfoil shaped impeller blades 348 and 349 arranged as best shown in Figure 7. The impeller rotors are adapted to be counter-rotationally driven by opposite ring gears 362 and 363 which mesh with the six pinions 317 carried on the outer ends of the radial drive shafts 78.

The rearward section 343 of the streamline envelope $E_L$, which is removably attached to the intermediate section at 365 constitutes the discharge through which the jet of commingled, combustion gases from the turbine nozzle N and air stream from the propulsive blower, pass. A heat exchanger for indirect transfer of heat from cooling fluid to air passing through the annular space 366 leading from the impellers 348—349 is formed by means of a spiral passage 367 formed between a corrugated sheet 368 and the inner skin 369 of the rearward section of the said envelope. Cooling fluid from the intermediate and final stage intercoolers is circulated through the spiral heat exchanger passages 367, through pipes 328 and return through 329 by means of a motor driven pump P in the manner hereinbefore described in connection with Figure 1. Heat exchange also takes place between the finished housings of the combustion chamber, turbine and nozzle and the rearwardly flowing stream of air from the blower impellers 348—349. The blower air stream thus serves to cool these housings while at the same time the heat thus given up to the air by the housings and heat exchanger is efficiently utilized to augment the power output of the discharged propulsive jet.

The unit comprising the power unit and its envelope $E_L$ may be conveniently installed in an outboard position in a wing as illustrated in Figure 6. In this type of installation the envelope $E_L$ may be diametrically split as shown at 370—370 on a plane passing through the longitudinal axis of the envelope and perpendicular to or at an obtuse angle to the spanwise plane of the wing. With this construction the longitudinal wing spars or beams 371 and 372 may be carried over and under the upper and lower portions of the power unit envelope and suitably pin connected at the parting line 370—370 of the envelope by suitable fittings as shown at 373 and 374. The envelope $E_L$ may thus be opened for convenient access to the power unit by removing the pins at 373 and 374 and detaching the outer half of the envelope together with the attached outer section 375 of the wing, while the inner half of the envelope which supports the power unit through two pairs of struts as shown at 353 remains assembled to the inner center section stub 376 of the wing. The accessories and cooling fluid lines and pumps may be conveniently located within the inner wing structure 376. A pair of dummy struts 353' extending from the shroud 344 serve to support the inner ends of two of the guide rods 356. My copending application Serial Number 120,793, filed October 11, 1949, describes and claims the wing installation of a powerplant just described.

Assuming now by way of a typical performance example that a speed of approximately 750 feet per second relative to the air at 47,000 feet pressure altitude has been attained by the power unit in the aircraft with which it may be associated, the operation of the apparatus, Figures 1 to 4, of this invention is briefly as follows:

The intermediate and final stage compressors $C_2$ and $C_3$ are driven at the turbine speed of approximately 15,600 R. P. M. through shafts 164 and 66 as hereinbefore described. The first stage axial compressor is driven at a speed lower than the turbine through the reduction gearing shown at 76, 77, 79 and 80 and through the fluid coupling F. The degree of coupling effected by the fluid coupling may be regulated by governing the quantity of oil it contains or by varying the angle of the incidence of internal vanes 382 and 382' of the coupling as shown in my copending applications, Serial No. 452,841, now Patent No. 2,379,183, issued June 26, 1945, and Serial No. 488,029, whereby its speed may be varied relative to both the turbine and intermediate compressor speeds under varying pressure altitude conditions as desired.

Air entering the forward end of the apparatus is divided and that portion entering the forward opening 11 leading to the first stage axial compressor $C_1$ will be initially compressed by impact by reason of the relative velocity of the unit, to a pressure of approximately 2.2 pounds per square inch absolute. The air is discharged from the axial blower into the annular passage 62 at a pressure of approximately 18 pounds per square inch absolute and thence it flows through the intercooler 96 to the inlet of the intermediate stage axial compressor $C_2$. Air at a pressure of approximately 50 pounds per square inch absolute from the said intermediate axial compressor $C_2$ passes through duct 100 and through intercooler 105 to the inlet of the final stage axial compressor $C_3$ and finally issues therefrom into the annular duct adjacent the entrance 110 of the combustion chamber S at a final pressure of approximately 130 pounds per square inch absolute.

The compressed air which passes through the Venturi shaped passages of the entrance to the combustion zone meets and mixes with the atomized spray of fuel projected from the spray nozzle head through the apertures 152 in the inner shroud burner members 135. The resultant fuel-air mixture, once ignited by the hot filament of a suitable glow plug 155, continues to burn throughout a substantial length of the combustion zone Z.

The heated gaseous combustion products and excess air are continuously released from the combustion chamber through the restricted openings in the annular nozzle ring 117 and into the initial stages of the gas turbine expansion zone.

The expanded and partially cooled gases from which a portion of the power has been extracted in passing through the gas turbine in the form of rotative torque applied to the turbine shaft 164 is discharged axially from the gas turbine expansion stages into the secondary combustion chamber within the spud $S_H$ and thence out through the inner radial openings in the spud to commingle at the rear end thereof with the concurrently flowing air stream from the propulsive compressor $P_H$ and passing between the interpositioned radial passages formed on the exterior of the spud. The commingled air and combustion gases which have thus interchanged their respective heats and velocities within the rearward portion of the envelope are finally discharged through the variable area nozzle $N_H$ in the form of a rearwardly directed and efficiently expanded high velocity reactive jet. The propulsive force exerted by the reaction of the gases leaving the said nozzle $N_H$ is the thrust which may be utilized in whole or in part to propel the unit and the vehicle with which it is associated.

When additional thrust is required and at certain times when maximum efficiency of operation of the unit need not be maintained, more or less supplementary fuel injection through the orifices 235 is employed. Such supplementary fuel enters the secondary combustion chamber within the spud $S_H$, in the case of the apparatus of Figures 1 to 3, in the form of a fine spray of a mixture of vaporized and atomized fuel where it meets and mixes in most part with the high velocity gases issuing from the gas turbine. Secondary combustion is thus promoted in the intermediate space between the refractory walls of the spud and the fuel inlet orifices with the excess air associated with the said gas turbine exhaust gases.

The throat members 331 and 332 may be moved forward or rearward to the extreme retracted and extended positions with respect to the outlet 334 to respectively increase or decrease the effective cross-sectional area of the outlet opening, by imposing a differential pressure on the annular piston 336 through pipes 339 and 340.

In general the positions of the throat members of the nozzle are varied between the extreme retracted and extended positions illustrated, for the purpose of correspondingly varying the turbine exhaust back pressure and to regulate the attendant turbine speed. The variation of throat member position also compensates for change in volumetric flow resulting from different adjustments of amount of supplementary fuel injection.

The propulsive compressor $P_H$ is driven at a speed of approximately 4700 revolutions per minute by the bevel ring gear 316 through the six bevel pinions 317 fixed to the outer ends of the radial drive shafts 78 which are in turn driven by the gas turbine through shaft 164—66 and gears 76 and 77.

That portion of the rammed air entering the forward end of the apparatus which passes into the diverging annular passage formed between the ram 13 and the surrounding forward section of the envelope is also initially compressed by impact, by reason of the relative velocity of the unit, to a pressure of approximately 2.8 pounds per square inch absolute, prior to entering the propulsive compressor $P_H$. Air is discharged from the propulsive compressor $P_H$ into the annular space 321 within the envelope $E_H$ surrounding the combustion chamber housing at a pressure of approximately 8.20 pounds per square inch absolute and thence flows on between the heat exchanger tubes 322 and through the external passages of the spud $S_H$ to commingle with the combustion gases from the turbine as hereinbefore described, and finally is discharged from the nozzle $N_H$ in the form of a propulsive jet.

Referring now primarily to the alternative apparatus of Figures 4 to 6 the operation is as follows:

That portion of the rammed air entering the forward end of the envelope $E_L$ and not inducted into the axial compressor $C_1$ passes into the divergent annular passage 352 formed between the axial compressor $C_1$ and the inner walls of the forward portion of the envelope $E_L$ at a pressure of approximately 3.3 pounds per square inch absolute at 40,000 feet altitude. From this point the air enters the counter-rotating impeller blades 348 and 349 at a substantially reduced speed and correspondingly increased pressure relative to that of the air entering the unit and thence flows rearwardly through the envelope and over the combustion chamber and turbine housings and in contact with the surface 369 of the heat exchanger 367 and finally after concurrent commingling and exchange of heat and kinetic energy with the combustion gases issuing from the nozzle N, passes out at the discharge opening of the envelope 342 as a propulsive jet of medium velocity. The impellers 348 and 349 are rotated at a speed of approximately 4,000 revolutions per minute.

At relatively low air speeds under approximately 200 feet per second, the annular throat member 355 will assume a rearward position as indicated in dotted lines at 358 whereby the opening area will be a maximum for the induction of a maximum volume of rammed air in both the axial compressor $C_1$ and the propulsive impellers 348—349. At higher air speeds over approximately 200 feet per second the pressure of the rammed air within the forward end of the envelope will cause the annular throat member 355 automatically to move forward against the drag of the entering air and to assume a forward position as shown, whereby the opening area will be a minimum for the induction of a reduced volume of rammed air for both the axial compressor $C_1$ and the propulsive impellers.

The so-called high pressure propulsive apparatus described in connection with Figures 1 to 4 is advantageous for more efficiently propelling certain types of aircraft of medium, high speed requiring higher thrust values such as for example medium heavy airplanes designed to fly at speeds from 400 to 550 miles per hour and where it is not necessary for structural and aerodynamic reasons to hold the maximum diameter of the power plant to the small dimensions which are possible with the jet propulsion unit alone. The necessity for employing relatively large diameter external propellers, thus eliminated, makes it possible to shorten landing gears and allows greater freedom in the location of the power plant envelopes or nacelles in the aircraft structure. For example, the power plant may be readily located in the wings, fuselage or tail of the airplane if desired without regard for propeller blade clearance and the undesirable effects of a turbulent slipstream such as that associated with the conventional externally located propeller, are obviated. Furthermore, due to the relatively large confined flow of air associated with this type of power plant employing an inclosed propulsive blower, substantially all of the heat dissipated from the power generating and compression components is captured and utilized by the propulsive air stream to augment the thrust efficiency of the power plant. Injection of supplementary fuel may also be carried further to produce abnormally large thrusts for short times when necessary.

The so-called low pressure propulsive apparatus described in connection with Figures 5 to 7 differs from the beforementioned high pressure apparatus in providing for the handling of a much larger mass of air by the propulsive blower at a considerably lower blower compression ratio and to this end a larger envelope or enclosure around the power unit with a larger air passage for the blower air is necessarily provided. This latter type of unit is advantageous where efficient operation at high thrust and at a medium speed is required and where a nacelle of comparatively large diameter is not objectionable. Such unit is feasible for long range heavily loaded bombing or commercial transport airplanes.

In either the high-pressure or low-pressure type of unit employing diverging diffusion conduits leading to the propulsive blower, the undesirable compressibility effects usually associated with the operation of conventional propellers are largely eliminated.

From the foregoing it will be evident that the invention may have a number of equivalent embodiments and arrangements of associated components. It is to be understood, therefore, that the foregoing is not limiting but may include any and all forms and apparatus which are included within the scope of the claims.

I claim:

1. In a reaction propulsive unit the combination of gas turbine means, a compressor having an inlet at its forward end and driven by the turbine means to supply air under pressure to the turbine means, a nozzle for discharging combustion gases from the turbine means, an envelope in spaced surrounding relation to said turbine means, compressor and nozzle leaving a separate air passage, a blower arranged in said passage rearwardly of the inlet of the compressor and driven by said turbine means to compress air in said passage, means for commingling the compressed air from said passage and the gases from said nozzle, and means for discharging the commingled air and gases rearwardly from said envelope in a propulsive jet.

2. In a gas reaction propulsive unit, apparatus comprising a gas turbine, a compressor driven by the turbine and supplying air under pressure thereto, a nozzle for discharging combustion gases from said turbine, an envelope having a divergent forward inlet adapted to receive rammed air and a convergent rearward outlet adapted to discharge compressed air, said envelope concentrically surrounding said nozzle, compressor and turbine and spaced therefrom to leave an air passage, a blower coaxially positioned in said passage in surrounding relation to said compressor and driven by said turbine to compress air in said passage, means concurrently to commingle compressed air from said blower and combustion gases from said nozzle and means to discharge said commingled air and gases rearwardly from said envelope in a propulsive jet.

3. In a gas reaction propulsive unit, apparatus comprising a gas turbine, a compressor driven by the turbine for supplying air under pressure thereto and having a forwardly facing inlet to receive rammed air, a nozzle for discharging combustion gases from said turbine, an envelope having a divergent forward inlet adapted to receive rammed air and a convergent rearward outlet adapted to discharge compressed air, said envelope concentrically surrounding said nozzle compressor and turbine and forming a substantially annular air passage therebetween, a blower coaxially positioned in said annular passage driven by said turbine and adapted to compress air in said passage, means concurrently to commingle compressed air from said blower and combustion gases from said nozzle and means to discharge said commingled air and gases rearwardly from the outlet of said envelope in a propulsive jet.

4. In a gas reaction propulsive unit, apparatus comprising a gas turbine, a compressor driven by the turbine for supplying air under pressure thereto, the compressor having a forwardly facing inlet adapted to receive rammed air, a combustion chamber between the compressor and turbine for supplying heated combustion gases to said turbine, an envelope having a divergent forward inlet adapted to receive rammed air and a convergent rearward outlet adapted to discharge compressed air and gases, said envelope concentrically surrounding said nozzle, turbine and combustion chamber and defining therewith a substantially annular air passage, a blower coaxially positioned in said annular passage at a point rearward of the inlet of said compressor and driven by said turbine to compress air in the rearward portion of said passage and to pass said compressed air in heat exchange contact with the housings of said combustion chamber and turbine, and means concurrently to commingle compressed air from said blower and combustion gases from said turbine and means to discharge said commingled air and gases rearwardly from the outlet of said envelope in a propulsive jet.

5. In a gas reaction propulsive unit, apparatus comprising a gas turbine, a combustion chamber for supplying heated combustion gases to said turbine, a compressor for supplying compressed air to said combustion chamber and having a forward inlet for receiving rammed air, an envelope having a divergent forward inlet in surrounding relation to the first named inlet and adapted to receive rammed air and having a convergent rearward outlet adapted to discharge compressed air and gases, said envelope concentrically surrounding said nozzle, turbine, combustion chamber, and compressor, and forming a substantially annular air passage therebetween, means in the inlet of the envelope for varying the volume of air flow into said passage, a blower coaxially positioned in said annular passage driven by said turbine and adapted to compress air in the rearward portion of said passage and to pass said compressed air in heat exchange contact with the housings of said combustion chamber and turbine, and means concurrently to commingle compressed air from said blower and combustion gases from said turbine and means to discharge said commingled air and gases rearwardly from the outlet of said envelope in a propulsive jet.

6. In a gas reaction propulsive unit, apparatus comprising a gas turbine, a combustion chamber for supplying heated combustion gases to said turbine, a compressor for supplying compressed air to said combustion chamber and having a forward inlet, an envelope having a divergent forward inlet in surrounding relation to the inlet of said compressor adapted to receive rammed air and a movable annular throat member to vary the effective area of said forward inlet of the envelope and a convergent rearward outlet adapted to discharge compressed air and gases, and means to vary the effective area of said rearward outlet, said envelope concentrically surrounding said nozzle, turbine, combustion chamber, and compressor, and forming a substantially annular air passage therebetween, a blower coaxially positioned in said annular passage driven by said turbine and adapted to compress air in the rearward portion of said passage and to pass said compressed air in heat exchange contact with the housings of said combustion chamber and turbine, and means concurrently to commingle compressed air from said blower and combustion gases from said turbine and means to discharge said commingled air and gases rearwardly from the outlet of said envelope in a propulsive jet.

7. In a gas reaction propulsive unit, a gas turbine, a combustion chamber for supplying heated combustion gases to the turbine, a compressor for supplying compressed air to the combustion chamber, the compressor having a forward inlet and the turbine having a rearward discharge nozzle, an elongated envelope having a forward inlet for receiving rammed air and an outlet for discharging compressed air and gases, said envelope surrounding said turbine, combustion chamber and compressor in spaced relation thereto to leave an annular air passage, blower means in said passage at the rear of the inlet of said compressor driven by the turbine to compress air in the passage, and a throat member movable in the inlet of the envelope having an inner surface acted upon by the induction flow pressures in the inlet of the passage and an outer surface acted upon by rammed air pressure whereby the member moves in response to aerodynamic conditions in the inlet of the passage and said rammed air pressures.

8. Apparatus according to claim 3 in which the blower comprises a pair of counter-rotating rows of impeller blades.

9. Apparatus according to claim 3 in which the blower comprises a plurality of alternate rows of rotatable and stationary impeller blades.

10. Apparatus according to claim 3 in which said divergent forward inlet adapted to receive air comprises a variable area opening.

11. Apparatus according to claim 3 and an annular throat member of streamline section slidably supported within said divergent forward inlet adapted to vary the effective cross-sectional area of said inlet.

12. Apparatus according to claim 3 and means to vary the cross-sectional area of the rearward outlet.

13. Apparatus according to claim 3 and an annular throat member of streamline section slidably supported within said convergent rearward outlet adapted to vary the effective cross-sectional area of said outlet.

14. In a gas reaction propulsive unit, apparatus comprising a gas turbine, a compressor for supplying combustion air to said gas turbine, an intercooler for said compressor, a nozzle for discharging combustion gases from said turbine, an envelope surrounding said turbine, compressor and nozzle forming an air passage therebetween, a blower in said passage driven by said turbine and adapted to compress air in said envelope and adapted to pass compressed air discharged from said blower in heat exchange contact with said intercooler, means to commingle concurrently compressed air from said blower and combustion gases from said nozzle and means to discharge said commingled air and gases rearwardly from said envelope in a propulsive jet.

15. In a gas reaction propulsive unit, apparatus comprising a gas turbine, a compressor for supplying combustion air to said gas turbine, an intercooler for said compressor, a nozzle for discharging combustion gases from said turbine, an envelope having forward and rearward openings coaxially surrounding said turbine, compressor, and nozzle, forming an annular air passage therebetween, a blower in said passage driven by said turbine and adapted to compress air in said passage, a heat exchanger in said envelope and adapted to transfer heat from said intercooler to compressed air discharged from said blower, means to commingle concurrently compressed air from said blower and combustion gases from said nozzle and means to discharge said commingled air and gases rearwardly from said envelope in a propulsive jet.

16. Apparatus according to claim 14 in which the means to commingle compressed air from said blower and combustion gases from said nozzle comprises a spud having a plurality of adjacent, axially parallel flow channels, alternate channels thereof being adapted to carry said combustion gases and said compressed air in separate, smoothly flowing concurrent streams and to unite uniformly the resultant streams of the gases and air simultaneously issuing from the ends of said adjacent channels to efficiently interchange their heat and kinetic energy.

17. Apparatus according to claim 14 in which the means to commingle compressed air from said blower and combustion gases from said nozzle comprises a spud having a plurality of adjacent, radially extending axially parallel flow channels, alternate channels thereof being adapted to carry said combustion gases and said compressed air in separate, smoothly flowing concurrent laminations and to unite uniformly the resulting laminations of the gases and air simultaneouly issuing from the ends of said adjacent channels to efficiently interchange their heat and kinetic energy.

18. Apparatus according to claim 14 in which the means to commingle compressed air from said blower and combustion gases from said nozzle comprises a flared spud having a plurality of adjacent, radially extending, axially parallel divergent flow channels, alternate channels thereof being adapted to carry said combustion gases and said compressed air in separate, smoothly flowing concurrent laminations and to unite uniformly the resultant laminations of the gases and air simultaneously issuing from the ends of said adjacent channels to efficiently interchange their heat and kinetic energy.

19. A reaction propulsive unit comprising a gas turbine, a compressor driven by the turbine and supplying compressed air thereto, the compressor having a forward inlet, a nozzle for discharging combustion gas from the turbine, a housing for the turbine and compressor, a tubular envelope in spaced surrounding relation to said housing to leave an annular air passage, the envelope having a forward inlet for receiving rammed air and a rearward outlet, a rotatable ring surrounding said housing, a drive from the turbine for rotating said ring, blower blading on said ring within said passage for compressing air therein, and means for commingling the compressed air from said passage and the combustion gases from said nozzle for rearward discharge from said rearward outlet.

20. A reaction propulsive unit comprising a gas turbine, a compressor driven by the turbine and supplying compressed air thereto, the compressor having a forward inlet, a nozzle for discharging combustion gas from the turbine, a housing for the turbine and compressor, a tubular envelope in spaced surrounding relation to said housing to leave an annular air passage, the envelope having a forward inlet for receiving rammed air and a rearward outlet, a rotatable ring surrounding said housing, a drive from the turbine for rotating said ring, said drive including at least one radial shaft driven by the turbine and extending from said housing, and a geared connection between said shaft and ring, blower blading on said ring within said passage for compressing air therein, and means for commingling the compressed air from said passage and the combustion gases from said nozzle for rearward discharge from said rearward outlet.

21. In a reaction propulsive unit, a gas turbine, a compressor driven by the turbine and supplying compressed air thereto, the compressor having a forward inlet, a nozzle for discharging combustion gas from the turbine, a housing for the turbine and compressor, a tubular envelope in spaced surrounding relation to said housing to leave an annular air passage, the envelope having a forward inlet for receiving rammed air and a rearward outlet, a rotatable ring surrounding said housing, a drive from the turbine for rotating said ring, blower blading on said ring within said passage for compressing air therein, means for commingling the compressed air from said passage and the combustion gases from said nozzle for discharge from said rearward outlet, and means rearward of the zone of said commingling for varying the effective area of said outlet.

22. In a reaction propulsive unit, a gas turbine, a compressor driven by the turbine and supplying compressed air thereto, the compressor having a forward inlet, a nozzle for discharging combustion gas from the turbine, a housing for the turbine and compressor, a tubular envelope in spaced surrounding relation to said housing to leave an annular air passage, the envelope having a forward inlet spaced forwardly from the compressor inlet and in concentric relation thereto, a blower in said passage rearwardly of the compressor inlet driven by the turbine to compress air in said passage, a movable annular throat member in the inlet of the envelope for varying the flow therethrough, and means for commingling the compressed air from said passage and the gases from said turbine for discharge from the rear end of the envelope.

23. A reaction propulsive powerplant comprising an air compressor, a gas turbine and a combustion chamber connected between the compressor and turbine, a generally cylindrical casing for said compressor, turbine and chamber, a tubular shroud having a divergent forward inlet and a convergent rearward outlet and arranged in spaced surrounding relation to said casing to leave an open annular air passage, axial flow compressor blading in the large-diametered portion of said passage around said casing, and means for transmitting power from the turbine to said blading to drive the same.

24. A reaction propulsive powerplant comprising an air compressor, a gas turbine and a combustion chamber connected between the compressor and turbine, casing means for said compressor, turbine and chamber, the compressor having a forward inlet, a tubular shroud surrounding said casing means in spaced relation thereto to leave an annular air passage, the shroud having a divergent forward inlet and a convergent rearward outlet, the inlet of the compressor being adjacent the divergent portion of the shroud, and axial-flow blading in said air passage positioned rearwardly of the compressor inlet and driven by the turbine.

25. In a gas reaction propulsive unit, a gas turbine, a combustion chamber for supplying heated combustion gases to the turbine, a compressor for supplying compressed air to the combustion chamber, the compressor having a forward inlet and the turbine having a rearward discharge nozzle, an elongated envelope having a forward inlet for receiving rammed air and an outlet for discharging compressed air and gases, said envelope surrounding said turbine, combustion chamber and compressor in spaced relation thereto to leave an annular air passage, and an axially movable throat member in the inlet of the envelope having an inner surface acted upon by the induction flow pressures in the inlet portion of the passage and an outer surface acted upon by rammed air pressure so that the member moves in response to aerodynamic conditions in the inlet of the passage and in response to said rammed air pressure.

26. A reaction propulsive power plant comprising a casing, a shroud spaced around the casing to leave an air passage, the passage being open at its forward end for the reception of air and being open at its rear end for the discharge of the air, blading in the passage surrounding the casing and operable to compress the air in the passage, the forward end of the casing being open for the reception of air, compressor means in the casing for compressing the air therein, gas turbine means in the casing driving said blading and said compressor means, a combustion chamber in the casing connected between said compressor means and turbine means, and a nozzle at the rear end of the casing for discharging the combustion gases from the turbine.

27. A reaction propulsive power plant comprising a casing open at its forward end to receive air, compressor means in the casing for compressing the air, gas turbine means in the casing, a combustion chamber in the casing connected between the compressor means and gas turbine means, a nozzle at the rear end of the casing for discharging the combustion gases from the turbine, a shroud surrounding the casing and spaced therefrom to leave an air passage, the forward end of the passage being open for the reception of air, axial flow blading in the passage driven by the gas turbine means to compress the air in the passage, said blading being positioned rearwardly of the forward end of the casing, and a nozzle at the rear end of the shroud surrounding the first named nozzle for the discharge of air from the passage.

28. In a gas reaction propulsive unit the combination of a gas turbine, a compressor for supplying combustion air to the turbine, an intercooler for the compressor, a nozzle for discharging combustion gases from the turbine, an envelope surrounding the turbine, compressor and nozzle and forming an air passage therebetween, a heat exchanger in said air passage arranged so that the air flowing through said passage passes diagonally therethrough a flow system circulating a coolant through the intercooler and heat exchanger, the coolant serving to transfer heat absorbed at the intercooler to the air flowing through said passage and heat exchanger, means for commingling the air from said passage and the combustion gases from said nozzle, and means for discharging said commingled air and gases rearwardly in the form of a propulsive jet.

NATHAN C. PRICE.

REFERENCES CITED

The following references are of record in the file of this patent:

UNITED STATES PATENTS

| Number | Name | Date |
|---|---|---|
| 658,586 | Reiling | Sept. 25, 1900 |
| 1,725,914 | Hallowell | Aug. 27, 1929 |
| 1,779,009 | Negro | Oct. 21, 1930 |
| 2,085,761 | Lysholm | July 6, 1937 |
| 2,108,411 | Rockwell | Feb. 15, 1938 |
| 2,162,956 | Lysholm | June 20, 1939 |
| 2,168,726 | Whittle | Aug. 8, 1939 |
| 2,280,835 | Lysholm | Apr. 28, 1942 |
| 2,356,557 | Anxionnaz et al. | Aug. 22, 1944 |
| 2,360,130 | Heppner | Oct. 10, 1944 |
| 2,396,911 | Anxionnaz et al. | Mar. 19, 1946 |
| 2,397,998 | Goddard | Apr. 9, 1946 |
| 2,404,767 | Heppner | July 23, 1946 |

FOREIGN PATENTS

| Number | Country | Date |
|---|---|---|
| 523,468 | Great Britain | July 15, 1940 |
| 844,442 | France | Apr. 24, 1939 |

OTHER REFERENCES

Ser. No. 367,666, Anxionnaz et al. (A. P. C.), published May 25, 1943.

Ser. No. 367,667, Anxionnaz et al. (A. P. C.), published April 27, 1943.